United States Patent
Moros Ortiz et al.

(10) Patent No.: US 11,237,950 B2
(45) Date of Patent: Feb. 1, 2022

(54) QUANTIFYING TESTER SENTIMENT DURING A DEVELOPMENT PROCESS

(71) Applicant: International Business Machines Corporation, Armonk, NY (US)

(72) Inventors: Jorge Andres Moros Ortiz, Melbourne (AU); Khoi-Nguyen Dao Tran, Southbank (AU); Kimiko Wilson, Southbank (AU)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/732,461

(22) Filed: Jan. 2, 2020

(65) Prior Publication Data
US 2021/0209009 A1    Jul. 8, 2021

(51) Int. Cl.
G06F 9/44      (2018.01)
G06F 11/36     (2006.01)
G06F 40/20     (2020.01)

(52) U.S. Cl.
CPC ...... *G06F 11/3688* (2013.01); *G06F 11/3664* (2013.01); *G06F 40/20* (2020.01)

(58) Field of Classification Search
CPC ... G06F 11/3688; G06F 40/20; G06F 11/3664
See application file for complete search history.

(56) References Cited

U.S. PATENT DOCUMENTS 9,135,104 B2   9/2015 Dvir et al.
9,547,408 B2   1/2017 Bromer
9,760,913 B1*  9/2017 Allen .................. G06F 11/36
2012/0053977 A1* 3/2012 Bagheri ......... G06Q 10/063112
                                              705/7.14
2013/0265314 A1* 10/2013 Laughlin ........... H04N 21/4756
                                              345/440
2014/0365397 A1* 12/2014 Mitra ................. G06Q 30/0282
                                              705/347
2016/0300135 A1* 10/2016 Moudy ................ G06F 40/30
2018/0039530 A1   2/2018 Ciabarra, Jr. et al.
2021/0065222 A1* 3/2021 Schuh ............... G06Q 30/0204

OTHER PUBLICATIONS

Garcia et.al., Multimodal Affective Computing to Enhance the User Experience of Educational Software Applications, Mobile Information Systems, Sep. 2018. 11 Pages.

* cited by examiner

*Primary Examiner* — Hang Pan
(74) *Attorney, Agent, or Firm* — Cantor Colburn LLP; Joseph Petrokaitis

(57) ABSTRACT

Aspects of the invention include a computer-implemented method for quantifying tester sentiment. The computer-implemented method includes receiving a first feedback data from a first tester, where the first feedback data represents feedback generated by the first tester in connection with a first instance of a first software-under-development. The first feedback data is correlated to an aspect of the first instance of the first software-under-development to derive a tester sentiment data. The tester sentiment data is used to determine a tester sentiment rating of the first instance of the software-under-development. Based on the tester sentiment rating, a resource is applied to the first instance of the first software-under-development.

20 Claims, 5 Drawing Sheets

QUANTIFYING TESTER SENTIMENT DURING A DEVELOPMENT PROCESS

BACKGROUND

The present invention generally relates to software development, and more specifically, to quantifying tester sentiment during a development process.

Software development involves the process of building a software application through a pipeline. The software development pipeline includes developers, business owners, and testers that collaborate to identify and execute the software's objectives, design, testing, and verification. Testers are people employed to test the software throughout the different development phases. In many instances, software manufacturers use tracking systems to manage hundreds of testers to test various instances of software in development.

SUMMARY

Embodiments of the present invention are directed to quantifying user sentiment during a development process. A non-limiting example computer-implemented method includes receiving a first feedback data from a first tester, where the first feedback data represents feedback generated by the first tester in connection with a first instance of a first software-under-development. The first feedback data is correlated to an aspect of the first instance of the first software-under-development to derive a tester sentiment data. The tester sentiment data is used to determine a tester sentiment rating of the first instance of the software-under-development. Based on the tester sentiment rating, a resource is applied to the first instance of the first software-under-development.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
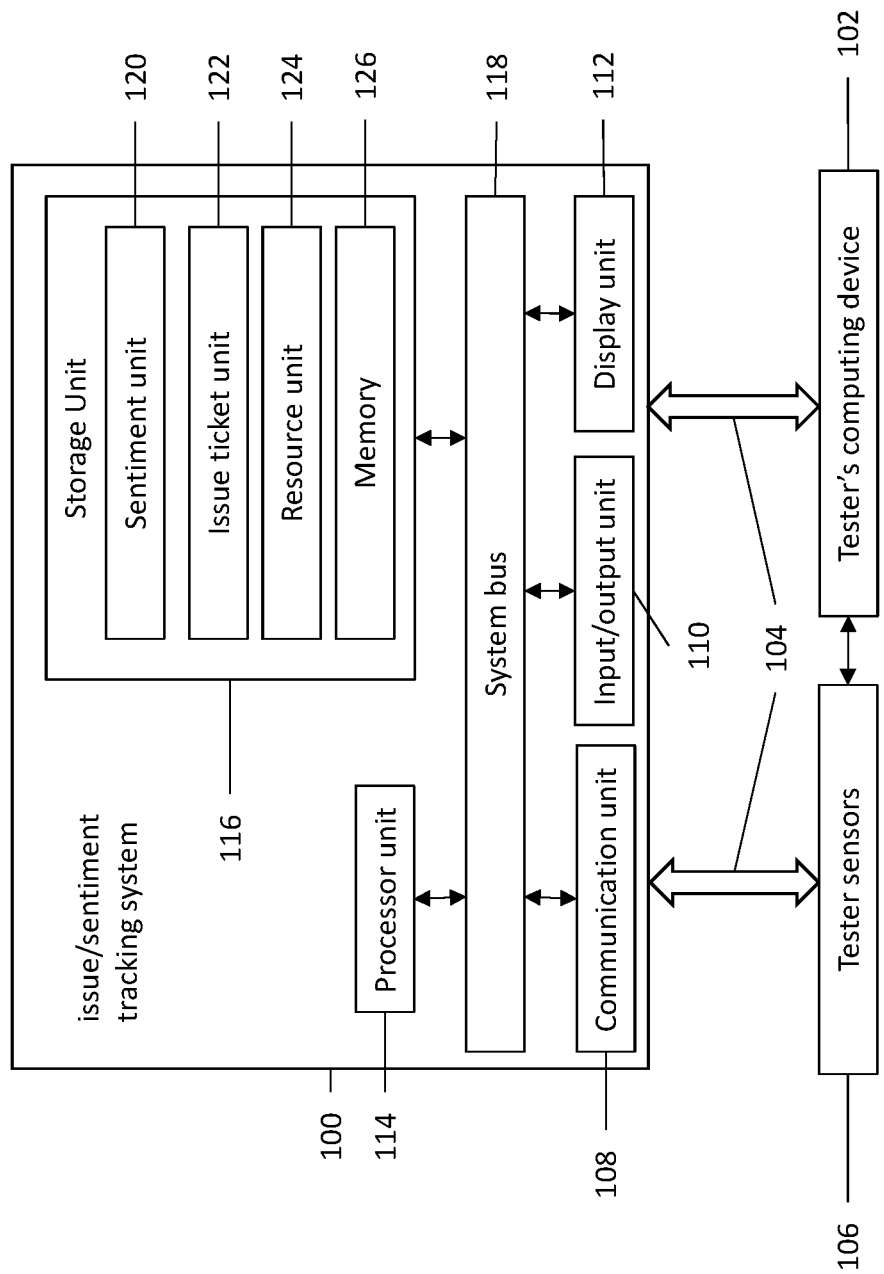
FIG. 1 illustrates a block diagram of components of a ticket issue/sentiment tracking system in accordance with one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

DETAILED DESCRIPTION

As used herein, the term "software-under-development" is used herein to refer to software that is at one of the various stages of software development and testing prior to deployment. The term "testing software" refers to software programs that are configured and arranged to interact with and place loads on software-under-development to test the software-under-development's performance. The term "tester" is used to identify the person assigned to initiate and monitor the execution of testing software.

One or more embodiments of the present invention provide systems and methods for issuing tickets for testing software applications and monitoring the tester sentiment in real-time to discern information regarding a malfunctioning application, and a poorly operating software application that causes frustration on the part of the tester.

Software testing seeks to proactively reduce the risk of negative customer experience prior to deployment of a software application. Software testing is performed in various forms, each having advantages and disadvantages. Black box testing evaluates the functionality of an application through the entering inputs and recording the outputs, without concern for the derivation of the outputs. White box testing involves a tester that is aware of the internal mechanisms and source code. During white box testing, the tester uses testing software to enter inputs into the software-under-development. However, unlike black box testing, the tester is generally aware of an expected output based on the understanding of the software. Acceptance testing involves a tester performing some tests towards the expectations of a customer, and other tests against the system as a whole.

Each of these forms of testing involves testers being asked to test software-under-development at various stages under different protocols. Unfortunately, software defects related to tester frustration are often not captured as they are subjective and tester frustration is not described in any tickets. For example, a tester may indicate on a ticket that a hyperlink did not direct the tester to a correct webpage. However, in a situation where the hyperlink directed the tester to the correct webpage with a perceptible delay, the tester may be unwilling to record the delay if the tester subjectively believes that the delay in executing the redirection, while unsatisfactory, was not overly burdensome. In other words, testers will only relay their frustration with an instance of a software application if the tester subjectively believes that the time required to lodge the complaint is warranted. For example, a given tester could consider that a time delay lasting minutes is worth reporting, while another tester may consider any delay longer than a few seconds worth reporting. Thus, many potential issues related to the software-under-development are perceived by the tester during testing operations but can go unrecorded due to the subjective judgment of the tester about the importance of the potential issue.

One or more embodiments of the present invention address one or more of the above-described shortcomings of the prior art by providing a ticket issue/sentiment tracking system configured and arranged to record real-time tester sentiment data and provide the real-time tester sentiment data to developers during the testing process. The tester sentiment data can be analyzed to infer therefrom a measure of the level of frustration being experienced by the tester. Thus, the tester sentiment data can be treated as a form of automatically recorded software-under-development performance data that does not rely on an overt act by the tester in order to be recorded/captured. By capturing the tester sentiment data in real-time, developers can have additional data that can be used to better prioritize the defect fixes needed to be made prior to deployment of the software. The ticket issue/sentiment tracking system also allows the developers to experience the tester's frustration levels in features, user flows, and the overall sentiment associated with the tester's experiences with the software-under-development.

Turning now to FIG. 1, a ticket issue/sentiment tracking system 100 is generally shown in accordance with one or more embodiments of the present invention. The ticket issue/sentiment tracking system 100 includes a network of computers, data processing systems, including a cloud computing environment. The ticket issue/sentiment tracking system 100 is in operable communication with multiple testers' computing devices 102 via a communication interface 104. The communication interface 104 includes landline interface, online interfaces, and cloud computing interfaces. In some embodiments of the present invention, the ticket issue/sentiment tracking system 100 is additionally in operable communication with sensors 106 operable to sense respective data, including biometric data, generated by each tester.

The ticket issue/sentiment tracking system 100 includes a communication unit 108, an input/output unit 110, and a display unit 112. The communication unit 108, the input/output unit 110, and the display unit 112 are in communication with a processor unit 114 and a storage unit 116 via a system bus 118. The storage unit 116 includes a sentiment unit, 120, an issue ticket unit 122, a resource unit 124, and a memory 126.

The processor unit 114 is operable to execute instructions for software applications and programs under development that are loaded into memory 126. The processor unit 114 includes one or more hardware processor devices or includes a multi-processor core. In some embodiments of the present invention, the processor unit 114 is a symmetric multi-processor system containing multiple processors of the same type.

The storage unit 116 includes a hard disk, a magneto-optical medium, an optical medium such as a CD-ROM, a digital versatile disk (DVDs), or BLU-RAY disc (BD), semiconductor device, or other type of device appropriate for electronic data storage. The storage unit 116 stores the sentiment unit 120, which controls the process of determining resource allocation to a software-under-development based on a sentiment rating. The sentiment unit 120 stores upper and lower threshold sentiment ratings for respective instances of software-under-development. The sentiment unit 120 further receives aggregate sentiment ratings from a tester's sensors 106. In addition to receiving sensor-based sentiments, the sentiment unit 120 is operable to analyze written/narrative reviews from individual testers using natural language processing (NLP) techniques to discern a tester's sentiment regarding an instance of software-under-development.

The sentiment unit 120 adopts machine learning techniques to perform NLP analysis on the written feedback of the ticket and the metadata associated with the ticket. NLP is utilized to derive meaning from natural language. For example, even if, a tester does not expressly state enjoyment or frustration, the sentiment unit 120 discerns written clues from the language to discern a favorable or unfavorable sentiment. The sentiment unit 120 can analyze the content of the feedback by parsing, syntactical analysis, morphological analysis, and other processes including statistical modeling and statistical analysis. The type of NLP analysis can vary by language and other considerations. The NLP analysis is utilized to generate a first set of NLP structures and/or features which can be utilized by a computer to identify and generate sentiment ratings. These NLP structures include a translation and/or interpretation of the natural language input, including synonymous variants thereof. The sentiment unit 120 can analyze the features to determine a context for the features. NLP analysis can be utilized to extract attributes (features) from the natural language. These attributes include, but are not limited to, a time used to create the feedback, language used in the feedback, context of feedback, and other appropriate attributes. These extracted attributes and historical file save data can be analyzed by the sentiment unit 120 to determine a sentiment of the tester as to an instance of the software-under-development. The sentiment rating is normalized to a value between zero and one. A sentiment value of zero indicates extreme frustration, with the values increasing towards one to express increased satisfaction. Frustration can result from slow processes, application crashes, poor interface design, overall experience or other experiences that negatively impact a tester's experience. A value of one indicates a highest level of satisfaction. The normalized sentiment value can be presented to an engineer via the display unit 112.

In some embodiments, in order to discern a negative tester sentiment, the system monitors the sensor data from a tester as well as the instance of the software-under-development that the tester is testing as the sensor data is being recorded. The system determines whether a tester has reported an instance as causing frustration based on a comparison of the feedback and the sensor data. For example, sensor-based data from a tester may indicate that a tester is frustrated with a log-in procedure. However, a returned ticket makes no mention of any issues with the log-in procedure. As an example, one issue with the log-in procedure is a time required to complete the log-in.

The sentiment data is provided in the form of data packets that provide a set of time series data of the physiological signals from the tester' sensors 106. The tester's sensors 106 are operable to communicate with the ticket issue/sentiment tracking system 100 via the internet, USB cable, hard wiring, or any other form of communication. The ticket issue/sentiment tracking system 100 also collects information from a tester's computing device 102 or a server (not shown) that is hosting the software-under-development to collect another set of time series data in relation to the instance of the software-under-development that is being tested. The information includes, for example, which procedure, page, which section of a page is being tested, user interaction with the page, and information specific to the device (i.e., desktop, mobile device, watch). In some embodiments, this information can be in the form of metadata related to the software-under-development, the testing software, a browser, and a device settings.

To quantify the time series data, the ticket issue/sentiment tracking system 100 correlates the values to a table or chart and a set of weights to derive the sentiment rating. This analysis can be performed from a single point in the time series data or a set of points. For example, a set of increasing peak values from time series data of pressure applied to a keyboard can be indicative of increasing frustration. Whereas a set of descending peak values from time series data of pressure applied to a keyboard can be indicative of decreasing frustration. Depending upon the values of the increasing or decreasing peak values, the ticket issue/sentiment tracking system 100 correlates the values to a sentiment rating from a table. The ticket issue/sentiment tracking system 100 includes a table or chart for each source of physiological signals, whether they from the tester's sensors 106 or derived from written tester feedback.

A sentiment rating is correlated between the two sets of time series data. Each set of time series data is a set of values collected at discrete points in time. The ticket issue/sentiment tracking system 100 extracts local and absolute minima and maxima to isolate peaks in the physiological signal waveforms. The ticket issue/sentiment tracking system 100 uses time stamps to correlate the physiological signal peak from the first set of time series data with the particular instance or aspect of instance of the software-under-development from the second set of time series data. These peaks are used to derive the quantifiable sentiment rating by the ticket issue/sentiment tracking system 100. In addition to quantifying the sentiment rating, the ticket issue/sentiment tracking system 100 analyzes both set of time series data to derive trends in the tester's sentiments. For example, whether a sequence of two or more instances of the software-under development causes a lower or higher sentiment rating.

In addition, the ticket issue/sentiment tracking system 100 parses unstructured text/tester feedback using a multi-level natural language processing system by extracting parts of speech, and using rules-based extraction of patterns in the speech, to correlate with the instances of the software-under-development. The parts of speech and patterns are quantified and used to generate a vector. The numerical values of the vector are compared with a table or chart to derive a sentiment rating.

In instances that the system does detect negative sentiment, additional steps can be taken to address the issues. In situations, in which frustration is indicated by the tester, the system can allocate resources to address the issue. In addition, the system can modify a new ticket for the same instance, by specifically asking a tester to describe any issues with the instance that caused the negative sentiment.

In situations that the system determines that the tester did not report back that instance caused negative sentiment, the system can execute further steps. For example, the system can modify a new ticket for the same instance, by specifically asking a tester to describe any issues with the issues instance causing the negative sentiment. The system can also determine parameters/threshold values as to when an instance causes frustration but is not reported by a tester. For example, the system can record a length of time that the sensor-data is indicating that a first tester has a negative sentiment as to a log-in procedure. By analyzing returned tickets for the same instance, the system may determine that on average, a first tester will report a wait time if it is greater than a certain time period, but a second tester won't report the negative sentiment if the wait time is below a certain time period. In the same sense, a first tester may report frustration with a procedure if it requires a number of steps greater than a certain threshold, but a second tester won't report their frustration if the number of steps are lower than the threshold amount. The system aggregates the data from all of the testers of an instance to determine average values to use as threshold amount.

In each of these scenarios, the system determines, based on the sensor-based data that there are instances for which a tester has a negative sentiment, but may not actively report the sentiment. Therefore, the system can modify a new ticket for the same instance, by specifically asking a tester to describe any issues with the instance that caused the negative sentiment. For example, if the system determines that on average if testers spend between thirty second and one minute to complete a log-in, the tester's experience frustration, but are not likely to report it, the system modifies a new ticket for the same instance to expressly ask if the tester spent between thirty seconds and one minute on the log-in procedure.

The issue ticket unit 122 controls issuance of tickets to individual testers and stores completed tickets. Each ticket includes an instance to be tested, protocols for testing the instance, a ticket identification number, a link to the software-under-development, a portion to provide written comments, and relevant data for a tester. Instances to be tested that result in negative sentiment include, but are not limited to, a login/authentication portion of a website that requires an excessive amount of time, a password change procedure that is overly complicated, or chatbot interaction that is generating vague or unclear responses. The issue ticket unit 122 collects each return ticket and analyzes any written feedback from a tester to discern a sentiment regarding the instance. In addition to a written description of an issue, a tester has the ability to insert follow-up feedback to the ticket. The follow-up feedback includes a written description or images regarding a solution to an issue. In addition, the issue ticket unit 122 receives and associates any sensor-based data retrieved from the tester sensors 106 with the tester's respective ticket.

The resource unit 124 includes a database of all available resources to address an instance of software-under-development in the event that a sentiment is below a lower threshold or greater than an upper threshold. This includes resources that are readily available and resources that have already deployed to another instance of the software. In addition, the resource unit 124 determines a next step for each instance in terms of resource deployment for review by a support engineer. For example, based on a negative sentiment value being under a threshold, the resource unit 124 may determine that the instance should be referred to a subject matter expert (SME). In some instances, the ticket issue/sentiment tracking system 100 is simultaneously testing distinct instances of one or more software programs. The resource unit 124 is also operable to determine to redeploy resources directed towards working on one instance to another instance. For example, if resources have been deployed to fix an instance due to a negative sentiment value being less than a threshold level, those resources can be redeployed to a second instance if the negative sentiment is even greater and a level of importance of the second instance exceeds the first instance. Resources include, subject matter experts, engineers, developers, processing capacity, and a raise of priority of an instance, etc.

In one or more embodiments of the invention, the features of the various machine learning engines can be implemented by the resource unit 124 to determine if and which resources to deploy. In embodiments of the invention, the features of the machine learning engines can be implemented by executing machine learning (ML) algorithms. In general, ML algorithms, in effect, extract features from received data in order to "classify" the received data. Examples of suitable classifiers include but are not limited to neural networks (described in greater detail below), support vector machines (SVMs), logistic regression, decision trees, hidden Markov Models (HMMs), etc. The end result of the classifier's operations, i.e., the "classification," is to predict a class for the data. In this instance, the prediction would be a determination of appropriate resources to deploy to an instance of software-under-development.

The memory 126 includes Dynamic Random Access Memory (D-RAM), Static RAM (S-RAM), or other RAM, a flash memory, or other appropriate memory. The processor unit 114 and the storage unit 116 are each in operable communication with a system bus 118. The system bus 118 is used to effectuate communication between the processor unit 114, the storage unit 116 and communication unit 108, the input/output unit 110 and the display unit 112. It should be appreciated that the system bus 118 may be implemented using any suitable type of architecture that provides for a transfer of data between different components or devices.

The communication unit 108 includes, for example, a communications port, a wired transceiver, a wireless transceiver, and/or a network card. The communication unit 108 is operable of communicating using technologies such as Ethernet, fiber optics, microwave, xDSL (Digital Subscriber Line), Wireless Local Area Network (WLAN) technology, wireless cellular technology, Bluetooth technology and/or any other appropriate technology. The input/output unit 110 may operate using a technology such as Universal Serial Bus (USB), PS/2, Bluetooth, infrared, serial port, parallel port, and/or other appropriate technology. The input/output unit 110, for example, receives input data from an input device such as a keyboard, a mouse, a trackball, a touch screen, a touch pad, a stylus pad, and/or other device.

The display unit 112 is configured to communicate data and includes, a monitor, a liquid crystal display (LCD), light emitting diodes (LEDs), organic light-emitting diodes (OLEDs), or Digital Light Processing (DLP). The display unit 112 operates using technology such as Video Graphics Array (VGA), Super VGA (S-VGA), Digital Visual Interface (DVI), High-Definition Multimedia Interface (HDMI), or other appropriate technology. The display unit 112 is operable to communicate display data from the processor unit 114. The display unit 112 may be external to the ticket issue/sentiment tracking system 100. Alternatively, the display unit 112 may be included in the ticket issue/sentiment tracking system 100.

The tester's computing device 102 includes any computing device used by a tester and operable to communicate with the ticket issue/sentiment tracking system 100. The tester's sensors include pressure sensors, biometric sensors, or any other appropriate sensors. For example, a tester's keyboard can include pressure sensors on each key. As increased pressure is indicative of greater frustration with an instance of software-under-development. Other sensors can detect mouse movement, facial expressions, body temperatures, hand movements, breathing rate. These sensed characteristics can be compared to baseline characteristics to determine in real-time a tester's sentiment. Simultaneous to sensing the characteristics, the ticket issue/sentiment tracking system 100 is tracking the instance of the software being tested. In this sense, the ticket issue/sentiment tracking system 100 is operable to track the tester's sentiment in real-time in comparison with the instance that the tester is interacting with.

Figure 2:
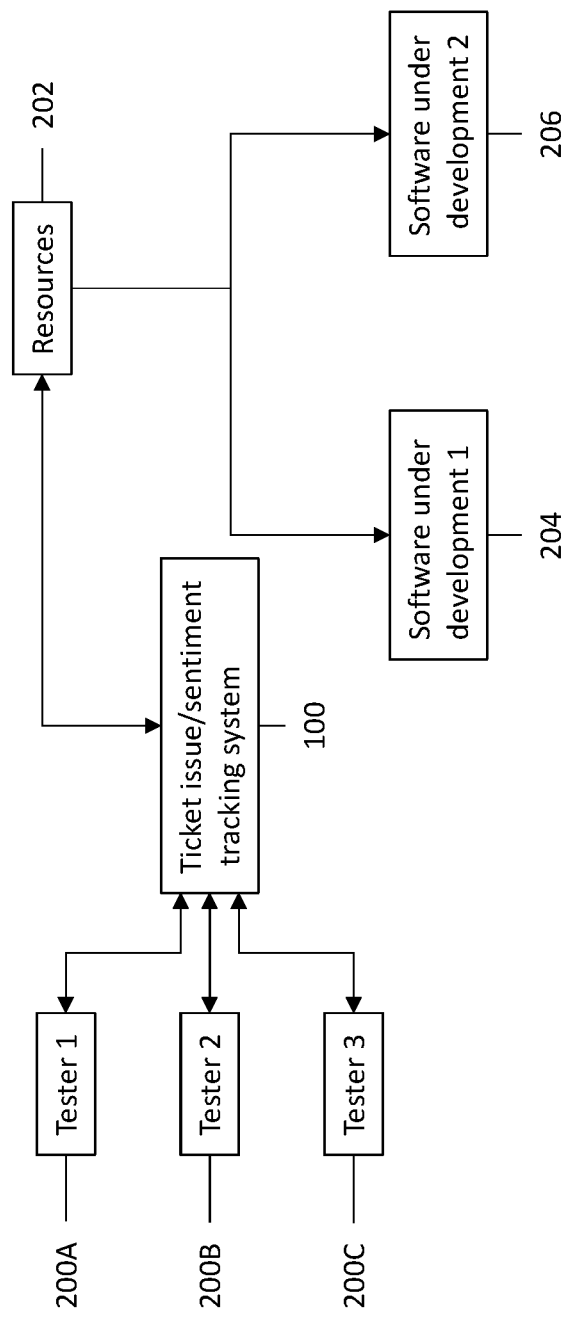
FIG. 2 illustrates a block diagram of components of a ticket issue/sentiment tracking system in accordance with one or more embodiments of the present invention.

Referring to FIG. 2, an illustration of the operation of the ticket issue/sentiment tracking system 100 is shown. Each tester 200A, 200B, 200C is in communication with the ticket issue/sentiment tracking system 100 via a respective computing device 102 and sensors 106. The ticket issue/sentiment tracking system 100 is connected to multiple resources 202 for addressing one or more instances of software-under-development 204, 206. The resources 202 include a database of available resources. For example, the resources include subject matter experts including their contact information, available processors, available processor cores, follow-up feedback, or trouble shooting information. The ticket issue/sentiment tracking system 100 is operable to deploy the resources in response to negative sentiment rating from the testers 200A, 200B, 200C. Therefore, ticket issue/sentiment tracking system 100 is operable to deploy the resources 202 to address one or more instances of software-under-development 204, 206 in real-time in response to a current negative sentiment. In this sense the development process is more efficient as any lag between receipt to a tester's feedback and deployment of resources is reduced.

As described above, ticket issue/sentiment tracking system 100 is operable to remove resources from a first instance of software-under-development 204 and redeploy the resource to a second instance of software-under-development 206. For example, if an SME is analyzing a first instance of the software-under-development 204 having a sentiment value of 4, and a second instance of the software-under-development 206 has a sentiment value of 1, the ticket issue/sentiment tracking system 100 can redirect the SME to the second instance of the software-under-development 206. In some instance, a support engineer can instruct the ticket issue/sentiment tracking system 100 of a priority of an instance of software-under-development 204, 206 and direct resources deployed based on falling below a threshold sentiment value. For example, if a higher priority second instance of the software-under-development 206 has a sentiment value of 4, and a first instance of the software-under-development 204 has a sentiment value of 3, the ticket issue/sentiment tracking system 100 would redirect resources from the first instance of the software-under-development 204 to the second instance of the software-under-development 206.

Figure 3:
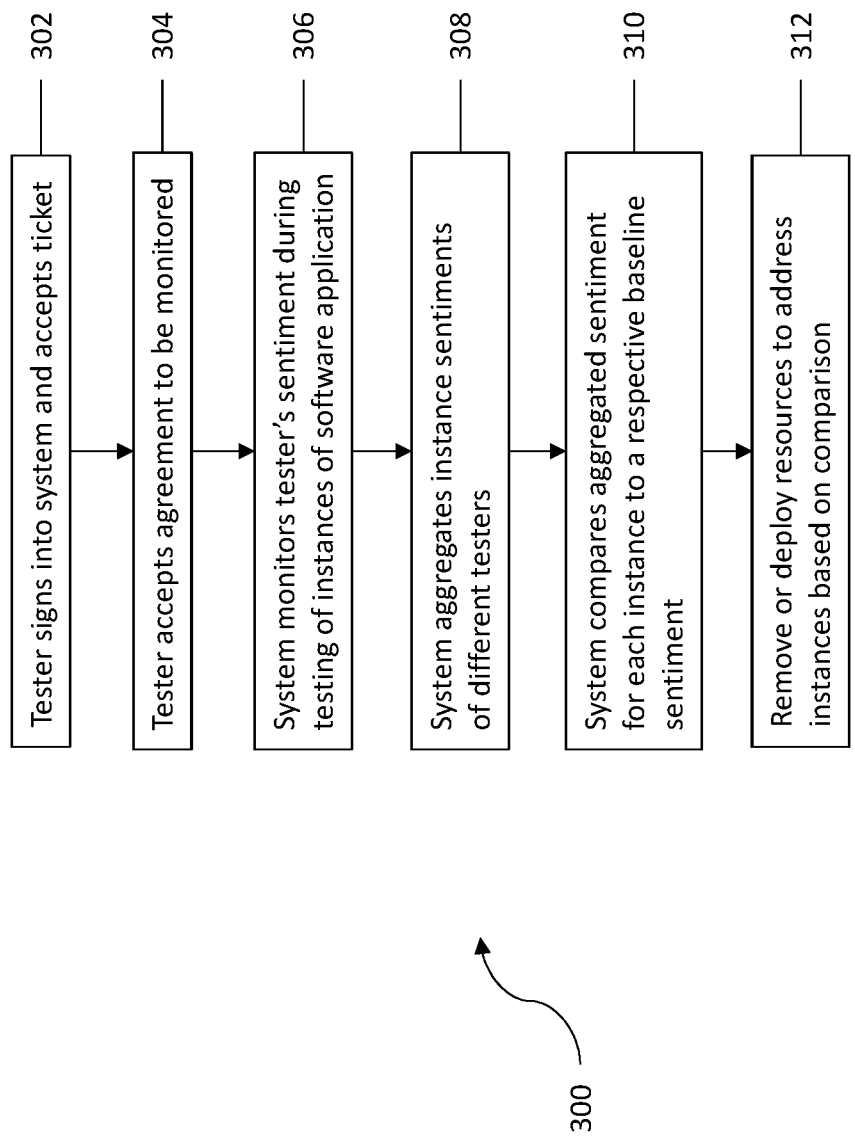
FIG. 3 illustrates a flow diagram of a process for quantifying sentiment in accordance with one or more embodiments of the present invention.

FIG. 3 depicts a flow diagram illustrating a method 300 for sentiment-based resource deployment, according to one or more embodiments of the invention. At block 302, each tester logs into the system and accepts a ticket created by the system.

In some embodiments of the present invention, the testers are chosen based on available resources. It should be appreciated that periodically, the available resources fluctuate, where in some instances, resource availability is expected, and at other times it is unexpected. The system is in operable communication with a resource unit. The resource unit not only tracks current available resources, but determines trends to forecast future availability. For example, if a machine learning-based software is being or will be developed concurrently with the subject software, and the machine learning-based software has a higher priority, the system forecasts a reduced number of machine learning-based SMEs. In some embodiments of the present invention, the detects which resources are available, for example, which SME's are available for reviewing software and forecasts which resources will be available and issues tickets to testers accordingly. For example, if the ticket needs to be resolved as soon as possible due to reduced resources in the future, the system only issues tickets to testers have a turnaround time under a threshold time period.

Additionally, particular sensors, for example, keyboard pressure sensors, heart rate monitors may be more adept at gauging a sentiment of a tester in relation to a particular form of the instance. For example, a keyboard pressure sensor may produce better sentiment data for testing a login procedure than facial recognition sensors. Therefore, the system only transmits tickets for testing a login procedure to testers equipped with keyboard pressure sensors. In other instances, written feedback produces the best sentiment data. The system monitors sentiment data from a tester and the originating mechanism (sensor, feedback, etc.). The system then compares monitored sentiment data with sentiment data from other testers that are testing the same instance of software to produce a confidence score regarding the best originating mechanism.

At block 304, the system transmits an authorization to monitor each tester via sensors and NLP techniques. If the tester accepts, the system commences monitoring the tester and the instance the tester is testing in real-time. The system verifies the instance through communication with the tester's computing device and the ticket, which identifies the target instance. If the tester does not accept, the system waits for the returned ticket. At block 306, the system monitors the tester's sentiment via the biometric readings, keyboard interaction, written feedback, and any other appropriate signals from the tester. In some embodiments of the present invention, the sensor-based sentiment readings are received as wave-based forms. The system has baseline signal values for comparison with the signals received from the tester. For example, the system has a baseline heart rate, expected perspiration, keystroke cadence. As a tester continues to respond to tickets, the system stores individualized baseline values for each tester.

At block 308, the system aggregates the sentiment ratings for each tester for each respective instance and produces an aggregate normalized value. During this process, outlier ratings that does not comport with an aggregate rating can be removed. Various statistical methods can be used to determine whether a sentiment rating is an outlier. In this sense, a tester whose sentiment may be affected by external sources, can have their sentiment rating removed. At block 310, the system compares the aggregate normalized value for each instance with a baseline normalized value to determine if any resources need to be deployed. After resources are deployed and the software has been fixed, the ticket issue/sentiment tracking system reissues the tickets, to determine if the responses have improved.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is a service oriented with a focus on statelessness, low coupling, modularity, and semantic interoperability. At the heart of cloud computing is an infrastructure that includes a network of interconnected nodes.

Figure 4:
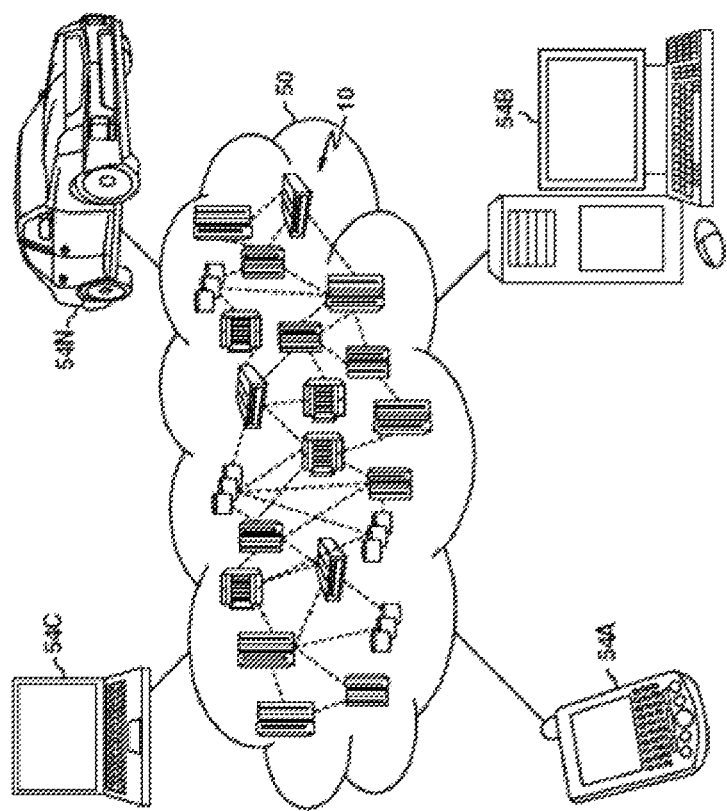
FIG. 4 depicts a cloud computing environment according to one or more embodiments of the present invention.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
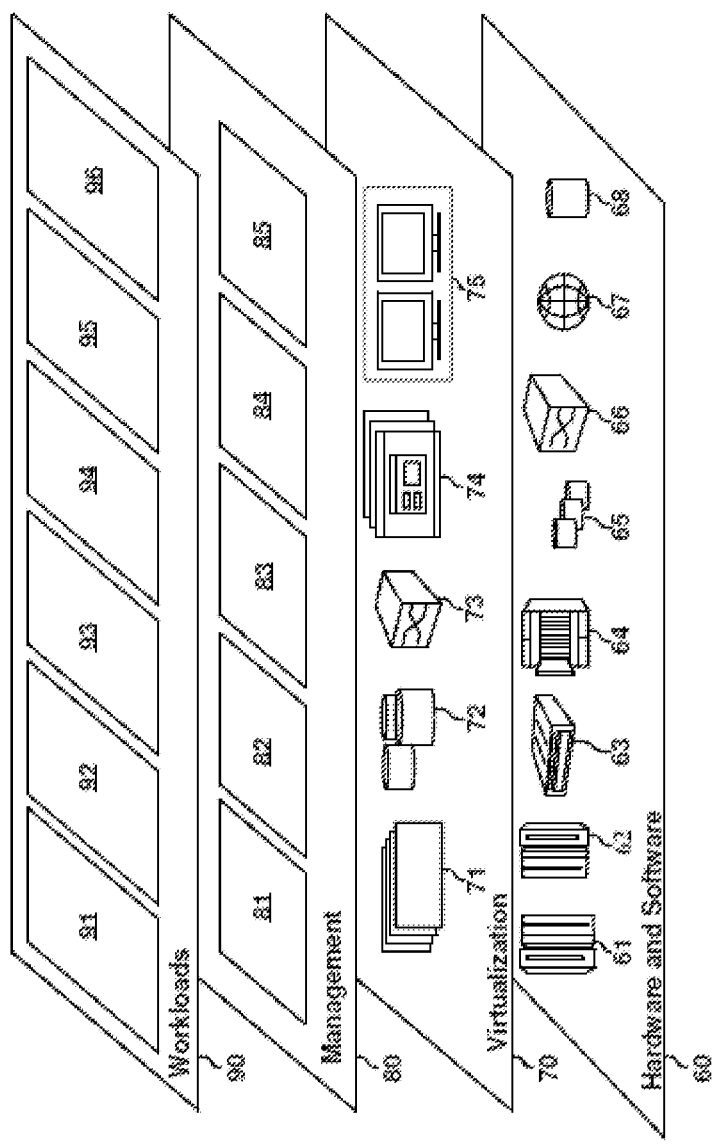
FIG. 5 depicts abstraction model layers according to one or more embodiments of the present invention.

Referring now to FIG. 5, a set of functional abstraction layers provided by cloud computing environment 50 (FIG. 1) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and ticket issue/sentiment tracking 96.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   executing, by a processor, a first instance of a first software-under-development;
   receiving, using the processor, a first feedback data from a first tester, the first feedback data representing feedback generated by the first tester in connection with the first instance of the first software-under-development, wherein the first feedback data comprises physiological data;
   correlating, by the processor, a first time stamp from the first feedback data to a second time stamp from an aspect of the first instance of the first software-under-development to derive a tester sentiment data;
   using, by the processor, the tester sentiment data to determine a negative tester sentiment rating of the first instance of the software-under-development;
   analyzing, by the processor and via natural language processing techniques, a third textual feedback;
   determining, by the processor and via the natural language processing techniques, that the first tester did not report the first instance of the software-under-development; and
   generating, by the processor, a ticket to request that the first tester describe any issues with the first instance of the software-under-development based on the negative tester sentiment and determination that the first tester did not report the first instance of the software-under-development.

2. The computer-implemented of claim 1, wherein the first feedback data further comprises text.

3. The computer-implemented of claim 2 further comprising:
   performing natural language processing analysis on the text to determine the sentiment rating.

4. The computer-implemented of claim 1, wherein the feedback is sensor-based data.

5. The computer-implemented of claim 1, wherein the resource is a subject matter expert.

6. The computer-implemented of claim 1, wherein the resource is removed from a second instance of the software-under-development based on the sentiment rating.

7. The computer-implemented of claim 1, wherein the first tester and the second tester are chosen from a plurality of testers based on a forecast of available resources.

8. A system comprising:
   a memory having computer readable instructions; and
   one or more processors for executing the computer readable instructions, the computer readable instructions controlling the one or more processors to perform operations comprising:
   executing a first instance of a first software-under-development;
   receiving a first feedback data from a first tester, the first feedback data representing feedback generated by the first tester in connection with the first instance of the first software-under-development, wherein the first feedback data comprises physiological data;
   correlating a first time stamp from the first feedback data to a second time stamp from an aspect of the first instance of the first software-under-development to derive a tester sentiment data;
   using the tester sentiment data to determine a tester sentiment rating of the first instance of the software-under-development;
   analyzing, via natural language processing techniques, a third textual feedback;
   determining, via the natural language processing techniques, that the first tester did not report the first instance of the software-under-development; and
   generating a ticket to request that the first tester describe any issues with the first instance of the software-under-development based on the negative tester sentiment and determination that the first tester did not report the first instance of the software-under-development.

9. The system of claim 8, wherein the first feedback data further comprises text.

10. The system of claim 9 further comprising performing natural language processing analysis on the text to determine the sentiment rating.

11. The system of claim 8, wherein the feedback is sensor-based data.

12. The system of claim 8, wherein the resource is a subject matter expert.

13. The system of claim 8, wherein the resource is removed from a second instance of the software-under-development based on the sentiment rating.

14. The system of claim 8, wherein the first tester and the second tester are chosen from a plurality of testers based on a forecast of available resources.

15. A computer program product comprising a computer readable storage medium having program instructions embodied therewith, the program instructions executable by a processor to cause the processor to perform operations comprising:

executing a first instance of a first software-under-development;

receiving a first feedback data from a first tester, the first feedback data representing feedback generated by the first tester in connection with the first instance of the first software-under-development, wherein the first feedback data comprises physiological data t;

correlating a first time stamp from the first feedback data to a second time stamp from an aspect of the first instance of the first software-under-development to derive a tester sentiment data;

using the tester sentiment data to determine a tester sentiment rating of the first instance of the software-under-development;

analyzing, via natural language processing techniques, a third textual feedback;

determining, via the natural language processing techniques, that the first tester did not report the first instance of the software-under-development; and generating a ticket to request that the first tester describe any issues with the first instance of the software-under-development based on the negative tester sentiment and determination that the first tester did not report the first instance of the software-under-development.

16. The computer program product of claim 15, wherein the first feedback data further comprises text.

17. The computer program product of claim 16 further comprising performing natural language processing analysis on the text to determine the sentiment rating.

18. The computer program product of claim 15, wherein the feedback is sensor-based data.

19. The computer program product of claim 15, wherein the resource is a subject matter expert.

20. The computer program product of claim 15, wherein the resource is removed from a second instance of the software-under-development based on the sentiment rating.

* * * * *